Figure 1:
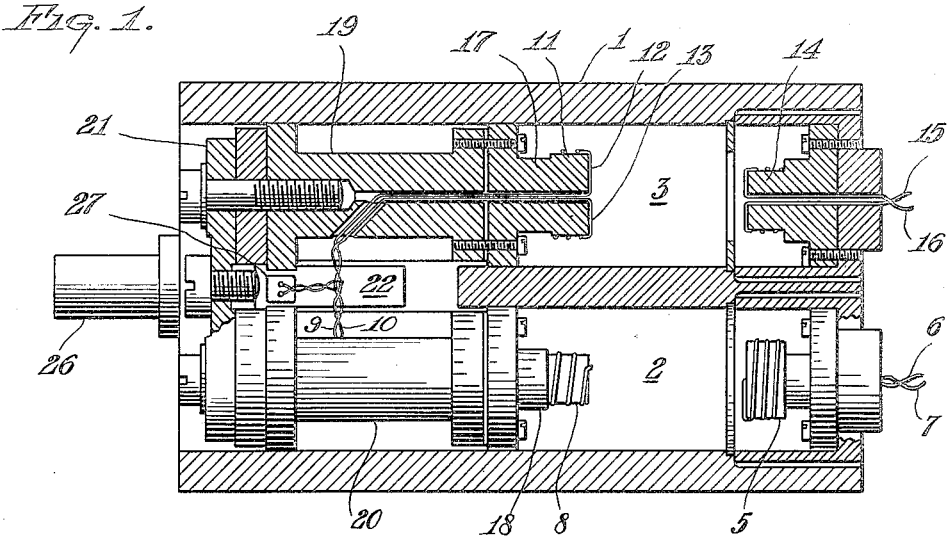

DOUWE PASMA
INVENTOR.

BY *Fred M Vogel*

AGENT.

Patented Sept. 26, 1950

2,523,391

UNITED STATES PATENT OFFICE 2,523,391

HIGH-FREQUENCY DAMPING TUBE

Douwe Pasma, Eindhoven, Netherlands, assignor to Hartford National Bank and Trust Company, Hartford, Conn., as trustee Application July 16, 1946, Serial No. 684,077
In the Netherlands November 28, 1942

Section 1, Public Law 690, August 8, 1946
Patent expires November 28, 1962

5 Claims. (Cl. 178—44)

The invention relates to attenuators adapted to be utilized with particular advantage for performing measurements in the range of the ultra-short wavelengths.

In order to obtain a predetermined attenuation of a measuring signal use may be made of the property that the field strength of a high-frequency field generated within a hollow tubular conductor decreases according to an $e$-function ($e$ being the base of the natural logarithm) with the distance in the direction of the axis of the tube.

With a known attenuator based upon this property the measuring signal to be attenuated is supplied to a coil which is arranged within a tubular conductor (which conductor is hereinafter referred to as "damping tube") while the attenuated measuring signal is taken from a coil which is positioned within the tube in the same manner as the first-mentioned coil but which is arranged at some distance from the latter, the latter coil being slidable in the axial direction. Between the logarithm of the attenuation factor and the distance between the two coils there exists a substantially linear relation, which affords a particular advantage in connection with the calibration of the attenuator.

As is well-known, the existence of the above-mentioned linear relation depends neither on the particular shape of the internal cross-section of the tubular conductor nor on the particular orientation of the mutually parallel coil axes with respect to the axis of the tube. The internal cross-section may be given, for example the shape of a circle or a square while the axis of the coils may be parallel or perpendicular to the axis of the tube. Besides, instead of coils condenser electrodes may be utilized as coupling members with the space enclosed by the damping tube. For a detailed description of a prior art device see "Proceedings of the Institute of Radio-Engineers", June 1935, page 578 ff.

However, a drawback of these known attenuators resides, as the applicant has stated, in that with wavelengths of a measuring signal to be attenuated of approximately 100 metres there only occur slight deviations from the above-mentioned linear relation which have no disturbing effect for many purposes, whereas with an attenuator serviceable for shorter waves, for example from 10 to 20 metres, there occur inadmissibly large deviations, so that in this case individual pointwise calibration of the attenuator is unavoidable. However, since here very short waves and attenuation factors of, say, $10^{-6}$ are involved, such a calibration can only be realized with extremely great difficulties so that it is very cumbersome.

The invention has for its object to avoid or, as the case may be, to reduce this drawback in the case of attenuators which comprise a damping tube in which are provided two coupling members which are slidable with respect to one another in the axial direction.

According to the invention, two fixed damping tubes each of which contains two mutually slidable coupling members, are arranged parallel to one another in such manner that the slidable coupling members of the two tubes are located at corresponding tube ends while these slidable coupling members are arranged so as to be immovable with respect to one another and are electrically coupled whereas the two other fixed coupling members are connected to the input and output terminals respectively of the attenuator.

The attenuator according to the invention has no connecting conductors, whose shape or length varies upon adjustment of the desired attenuation factor, and hence the above-mentioned drawback, which is chiefly due to the impedance of the connecting conductor or conductors of the slidable coupling member which impedance varies with the adjustment, is practically completely avoided.

A further advantage of the attenuator according to the invention resides in that the length of construction and the displacement which are required in order to obtain a predetermined attenuation are half as large as with the known attenuators.

If an attenuator according to the invention of the inductive type is utilized for a given frequency, the intermediate circuit which is formed in this case by the slidable coils should preferably be tuned to the operating wavelength.

Figure 2:
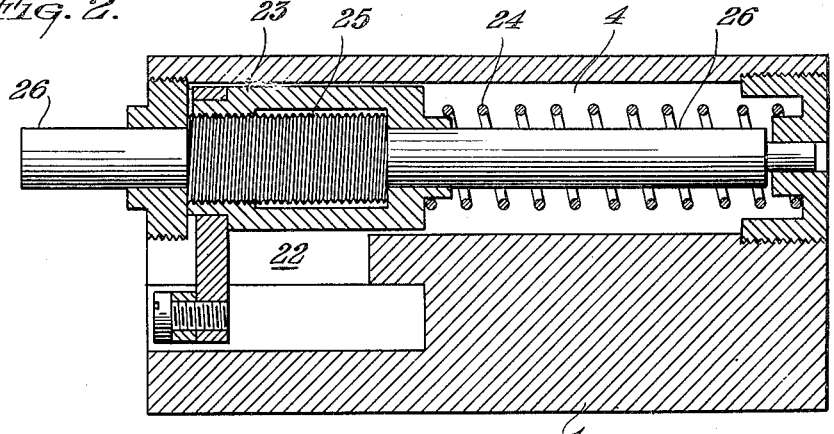
Figure 3:
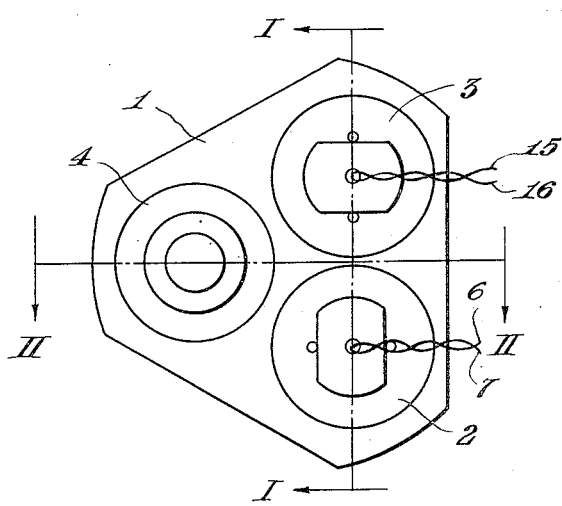

The invention will be explained more fully with reference to the accompanying drawing wherein Figures 1, 2 and 3 represent two mutually perpendicular longitudinal sections and a front view of one advantageous form of construction of an attenuator according to the invention of the inductive type.

In a metal block 1 which substantially has the shape of a right triangular prism are provided three bores 2, 3 and 4 which extend in the direction of the length. The bores 2 and 3 are used as damping tubes. To that end a fixed input coil 5 provided with connecting conductors 6 and 7 is provided at one of the ends of the damping tube 2 while within the latter a coil 8 provided with connecting conductors 9 and 10 is arranged so as to be slidable. In the other damping tube 3 are likewise provided a slidable coil 11 and a fixed coil 14 which are provided with connecting conductors 12, 13 and 15, 16 respectively. The fixed coils 5 and 14 of the two damping tubes, which coils constitute the input and output coils respectively of the attenuator, are located at corresponding ends of the damping tubes 2 and 3, like the two slidable coils 8 and 11. Since the connecting conductors 9, 10 and 12, 13 are connected to one another the two last-mentioned coils are connected in parallel so that the two damping tubes are electrically connected in series.

To prevent the connecting conductors connected to the slidable coils from having, upon adjustment, a varying shape and length, the two slidable coils 8 and 11 are arranged so as to be immovable with respect to one another. By means of supports 19 and 20 the coil bodies 17 and 18 of the coils 8 and 11 are connected to a bridge piece 21 which passes through a connecting slit 22 provided between the two damping tubes 2 and 3. The connecting slit 32 is provided in such manner that the walls of the operative portions of the damping tubes are not interrupted by it. The bridge piece 21 is secured to a sleeve 23 which is located in the bore 4 and which can be displaced in the direction of the axis, against the action of a spring 24, by turning a shaft 26 arranged in the bore 4 and provided with a screw thread 25. At the same time the coils 8 and 11 are thus displaced in the axial direction and the attenuation factor is accordingly changed.

As has been mentioned hereinbefore, the intermediate circuit formed by the coils 8 and 11 should preferably be tuned if the attenuator is intended to be utilized solely at one predetermined wavelength, the maximum output voltage of the attenuator being thus increased in the case of a constant input voltage. For tuning the intermediate circuit use may be made of a condenser connected in parallel with the coils 8 and 11 and supported by the bridge piece 21.

What I claim is:

1. A high-frequency attenuator comprising first and second conductive damping tubes for attenuating high-frequency energy exponentially along the length thereof and disposed in parallel relation, an input coupling member fixedly positioned in said first tube, a first coupling element arranged for axial movement within said first tube, an output coupling member fixedly positioned within said second tube, a second coupling element arranged for axial movement within said second tube, conductor means directly interconnecting said first and second elements, said conductor means being fully movable with said elements, and means for concurrently adjusting the positions of said elements within said tubes while maintaining said elements immovable within respect to each other.

2. A high-frequency attenuator comprising first and second conductive damping tubes for attenuating high-frequency energy exponentially along the length thereof and disposed in parallel relation and having a common wall section, said wall section being provided with a longitudinal slot communicating between said tubes, a plunger slidably arranged for axial movement within each tube, an input coupling member fixedly positioned within said first tube, a first coupling element secured to the end of the plunger adjacent said input member, an output coupling member fixedly positioned in said second tube, a second coupling element secured to the end of the plunger adjacent said output member, a bridge member extending through said slot and mechanically connecting the plungers of said first and second tubes whereby said first and second elements are immovable with respect to each other, and conductor means extending through said slot for electrically interconnecting said first and second coupling elements, said conductor means being fully movable with said elements.

3. A high-frequency attenuator comprising a metallic block having a pair of parallel bores therein to define first and second damping tubes for attenuating high-frequency energy exponentially along the length thereof, said block having a longitudinal slot therein communicating between said tubes, a plunger slidably arranged for axial movement within each tube, an input inductor fixedly positioned within said first tube, a first coupling element secured to the end of the plunger adjacent said input inductor, an output inductor fixedly positioned in said second tube, a second coupling element secured to the end of the plunger adjacent said output inductor, a bridge member extending through said slot and mechanically connecting the plungers of said first and second tube whereby said first and second elements are immovable with respect to each other, and conductor means extending through slot for electrically interconnecting said first and second coupling elements, said conductor means being fully movable with said elements.

4. A high-frequency attenuator comprising a metallic block having three bores therein triangularly disposed and in parallel relation, two of said bores defining first and second damping tubes for attenuating high-frequency energy exponentially along the length thereof, said block having a longitudinal slot connecting said three bores, a plunger slidably arranged for axial movement within each tube, an interiorly threaded sleeve slidably arranged for axial movement within the remaining bore, a shaft extending axially within said remaining bore through said sleeve, a portion of said shaft being externally threaded to engage said sleeve whereby rotation of shaft effects axial movement of said sleeve, a bridge member extending through said slot and mechanically connecting the plungers in said tubes and the sleeve in said remaining bore whereby said plungers and said sleeve are immovable relative to each other, an input inductor fixedly positioned in said first tube, a first coupling element secured to the end of the plunger adjacent said input inductor, an output inductor fixedly positioned in said second tube, a second coupling element secured to the end of the plunger adjacent said output inductor, and conductor means extending through said slot for electrically interconnecting said first and second coupling elements, said conductor means being fully movable with said elements.

5. An arrangement, as set forth in claim 4, wherein said attenuator is adapted for operation with energy of a predetermined wavelength and further includes a condenser supported by said bridge member and connected across said coupling elements to form a circuit resonant to said wavelength.

DOUWE PASMA.

REFERENCES CITED

The following references are of record in the file of this patent:

UNITED STATES PATENTS

| Number | Name | Date |
| --- | --- | --- |
| 1,970,315 | Jones | Aug. 14, 1934 |
| 2,101,247 | Earp | Dec. 7, 1937 |
| 2,158,252 | Polydorff | May 16, 1939 |
| 2,383,475 | Dodington | Aug. 28, 1945 |
| 2,411,553 | Ramo | Nov. 26, 1946 |
| 2,412,055 | Meahl | Dec. 3, 1946 |

FOREIGN PATENTS

| Number | Country | Date |
| --- | --- | --- |
| 519,435 | Great Britain | Mar. 27, 1940 |